United States Patent
Whitney et al.

(10) Patent No.: US 8,147,378 B2
(45) Date of Patent: Apr. 3, 2012

(54) AIRFLOW BASED IDLE SPEED CONTROL POWER SECURITY

(75) Inventors: Christopher E. Whitney, Highland, MI (US); Timothy J. Hartrey, Brighton, MI (US); Todd R. Shupe, Milford, MI (US); Ning Jin, Novi, MI (US); Etsuko Muraji Stewart, Laingsburg, MI (US); Richard B. Jess, Haslett, MI (US)

(73) Assignee: GM Global Technology Operations LLC

( * ) Notice: Subject to any disclaimer, the term of this patent is extended or adjusted under 35 U.S.C. 154(b) by 768 days.

(21) Appl. No.: 12/194,778

(22) Filed: Aug. 20, 2008

(65) Prior Publication Data
US 2009/0270225 A1    Oct. 29, 2009

Related U.S. Application Data

(60) Provisional application No. 61/048,685, filed on Apr. 29, 2008.

(51) Int. Cl.
*B60W 10/04* (2006.01)
(52) U.S. Cl. ........... 477/115
(58) Field of Classification Search ........ 477/98, 477/902, 97; 701/54, 102, 103, 110; 123/361, 123/394, 403
See application file for complete search history.

(56) References Cited

U.S. PATENT DOCUMENTS

| | | | |
|---|---|---|---|
| 3,964,457 A * | 6/1976 | Coscia | 123/339.21 |
| 6,405,587 B1 | 6/2002 | Livshiz | |
| 6,909,958 B2 * | 6/2005 | Post et al. | 701/84 |
| 7,742,866 B2 * | 6/2010 | McLain et al. | 701/103 |
| 2004/0230362 A1 | 11/2004 | Post, II et al. | |

FOREIGN PATENT DOCUMENTS
WO   WO 2007/046755 A1   4/2007

OTHER PUBLICATIONS

U.S. Appl. No. 61/019,945, filed Jan. 9, 2008, Christopher E. Whitney.

* cited by examiner

*Primary Examiner* — David D Le
*Assistant Examiner* — David J Hlavka

(57) ABSTRACT

An engine control system comprises a torque determination module, a limit determination module, a torque limit module, and a torque control module. The torque determination module determines a desired torque based on a desired engine speed. The limit determination module determines a torque limit based on one of an engine oil temperature and a transmission fluid temperature. The torque limit module determines a final torque based on the desired torque and the torque limit. The torque control module selectively determines a throttle area based on the final torque. A throttle valve is actuated based on the throttle area.

10 Claims, 6 Drawing Sheets

AIRFLOW BASED IDLE SPEED CONTROL POWER SECURITY

CROSS-REFERENCE TO RELATED APPLICATIONS

This application claims the benefit of U.S. Provisional Application No. 61/048,685, filed on Apr. 29, 2008. The disclosure of the above application is incorporated herein by reference.

FIELD

The present disclosure relates to engine speed control and more particularly to engine speed control in a torque-based system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

An engine control system comprises a torque determination module, a limit determination module, a torque limit module, and a torque control module. The torque determination module determines a desired torque based on a desired engine speed. The limit determination module determines a torque limit based on one of an engine oil temperature and a transmission fluid temperature. The torque limit module determines a final torque based on the desired torque and the torque limit. The torque control module selectively determines a throttle area based on the final torque. A throttle valve is actuated based on the throttle area.

A method of operating an engine control system comprises determining a desired torque based on a desired engine speed; determining a torque limit based on one of an engine oil temperature and a transmission fluid temperature; determining a final torque based on the desired torque and the torque limit; selectively determining a throttle area based on the final torque; and actuating a throttle valve based on the throttle area.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
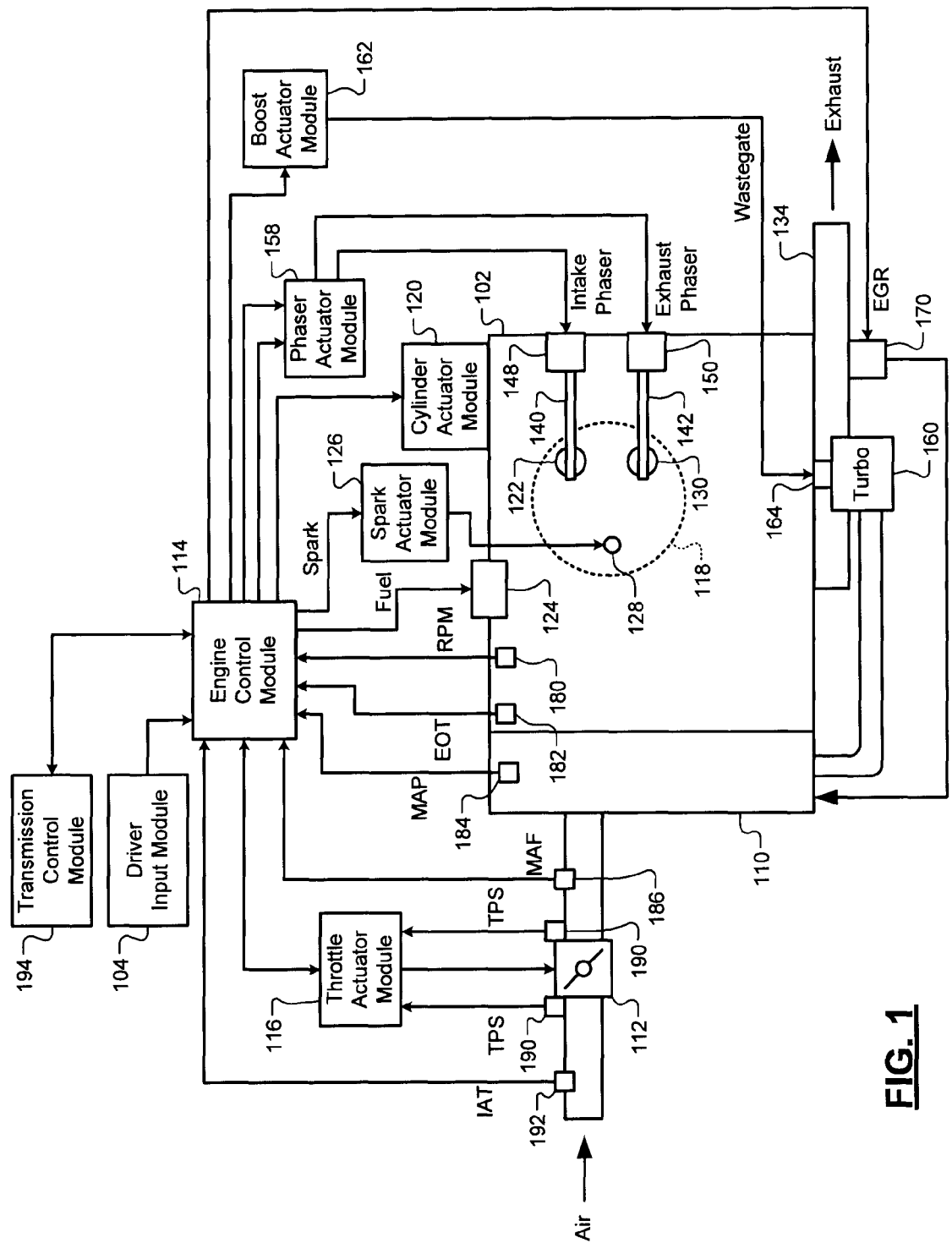
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate heat that is generated when air is compressed and that may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine oil may be measured using an engine oil temperature (EOT) sensor 182. The EOT sensor 182 may be located within the engine 102 or at other locations where the oil is circulated.

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100. The ECM 114 may communicate with a transmission control module 194 to coordinate shifting gears in a transmission (not shown). For example, the ECM 114 may reduce torque during a gear shift.

Various control mechanisms (i.e., actuators) of the engine system 100 may vary respective engine parameters of the engine 102. For example, the throttle actuator module 116 may change the blade position (i.e., actuator position), and therefore the opening area, of the throttle valve 112. Similarly, the spark actuator module 126 may control an actuator position that corresponds to an amount of a spark advance. Other actuators include the boost actuator module 162, the EGR valve 170, the phaser actuator module 158, the fuel injection system 124, and the cylinder actuator module 120. Actuator positions with respect to these actuators may correspond to boost pressure, EGR valve opening, intake and exhaust cam phaser angles, air/fuel ratio, and number of cylinders activated, respectively.

Figure 2:
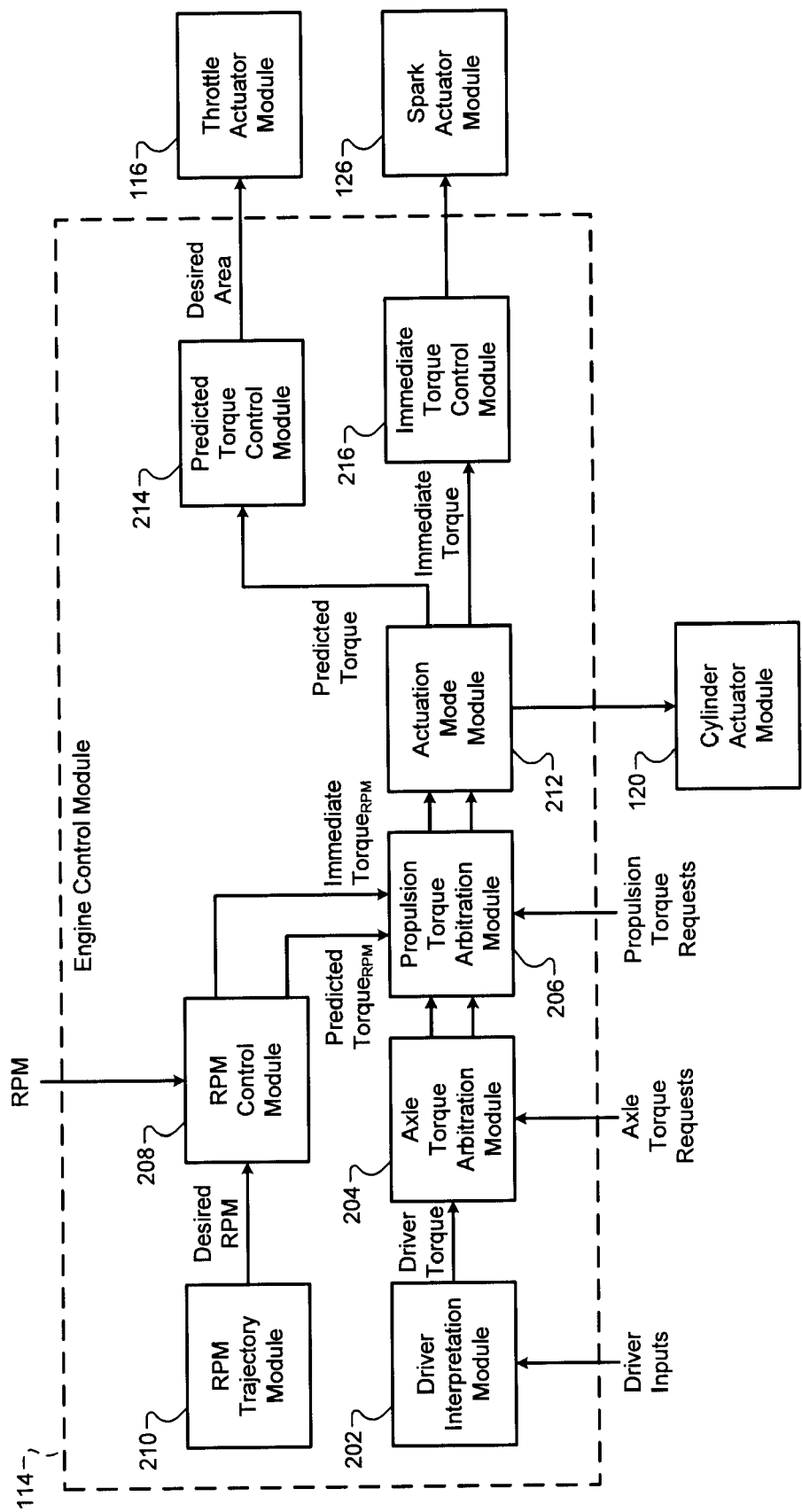
FIG. 2 is a functional block diagram of an exemplary implementation of an engine control module according to the principles of the present disclosure.

Referring now to FIG. 2, a functional block diagram of the ECM 114 is presented. The ECM 114 includes a driver interpretation module 202. The driver interpretation module 202 receives driver inputs from the driver input module 104. For example, the driver inputs may include an accelerator pedal position. The driver interpretation module 202 outputs a driver-requested torque.

The ECM 114 includes an axle torque arbitration module 204. The axle torque arbitration module 204 arbitrates between driver inputs from the driver interpretation module 202 and other axle torque requests. Other axle torque requests may include torque reduction requested during a gear shift by the transmission control module 194, torque reduction requested during wheel slip by a traction control system, and torque requests to control speed from a cruise control system.

Axle torque requests may also include requests from an adaptive cruise control module, which may vary a torque request to maintain a predetermined following distance. Axle torque requests may also include torque increases due to negative wheel slip, such as where a tire of the vehicle slips with respect to the road surface when the torque produced by the engine is negative.

Axle torque requests may also include desired brake torque management requests and torque requests intended to prevent vehicle over-speed conditions. Desired brake torque management requests may reduce engine torque to ensure that engine torque does not exceed the ability of the brakes to hold the vehicle when the vehicle is stopped. Axle torque requests may also be made by body stability control systems. Axle torque requests may further include torque cutoff requests, such as may be generated when a critical fault is detected.

The axle torque arbitration module 204 outputs a predicted torque and an immediate torque. The predicted torque is the amount of torque that will be required in the future to meet the driver's torque and/or speed requests. The immediate torque is the torque required at the present moment to meet temporary torque requests, such as torque reductions when shifting gears or when traction control senses wheel slippage.

The immediate torque may be achieved by engine actuators that respond quickly, while slower engine actuators are targeted to achieve the predicted torque. For example, a spark actuator may be able to quickly change spark advance, while cam phaser or throttle actuators may be slower to respond. The axle torque arbitration module 204 outputs the predicted torque and the immediate torque to a propulsion torque arbitration module 206.

The propulsion torque arbitration module 206 receives the predicted torque and the immediate torque and arbitrates between the predicted and immediate torque and propulsion torque requests. Propulsion torque requests may include torque reductions for engine over-speed protection and torque increases for stall prevention. Propulsion torque requests may also include torque requests from a speed control module, which may control engine speed during idle and coastdown, such as when the driver removes their foot from the accelerator pedal.

Propulsion torque requests may also include a clutch fuel cutoff, which may reduce engine torque when the driver depresses the clutch pedal in a manual transmission vehicle. Various torque reserves may also be provided to the propulsion torque arbitration module 206 to allow for fast realization of those torque values should they be needed. For example, a reserve may be applied for air conditioning compressor turn-on and for power steering pump torque demands.

A catalyst light-off or cold start emissions process may vary spark advance for an engine. A corresponding propulsion torque request may be made to balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example, they may always win arbitration or may override arbitration altogether. The propulsion torque arbitration module 206 may still receive these requests so that, for example, appropriate data can be fed back to other torque requesters.

The propulsion torque arbitration module 206 arbitrates between torque requests from the axle torque arbitration module 204, an RPM control module 208, and other propulsion torque requests. Other propulsion torque requests may include, for example, torque reductions for engine over-speed protection and torque increases for stall prevention.

The RPM control module 208 receives the RPM signal from the RPM sensor 180 and outputs a predicted and immediate torque request to the propulsion torque arbitration module 206. The propulsion torque arbitration module 206 may simply select the torque requests from the RPM control module 208 when the ECM 114 is in RPM mode. RPM mode may be enabled when the driver takes their foot off the pedal. RPM mode may then be used for vehicle coastdown as well as when the vehicle is idling. RPM mode may be selected when the predicted torque requested by the axle torque arbitration module 204 is less than a calibrated torque value.

The RPM control module 208 receives a desired RPM from an RPM trajectory module 210. The RPM trajectory module 210 determines a desired RPM for RPM mode. For example only, the RPM trajectory module 210 may output a linearly decreasing RPM until the RPM reaches an idle RPM. The RPM trajectory module 210 may then continue outputting the idle RPM.

In various implementations, the RPM trajectory module 210 may function as described in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

An actuation mode module 212 receives the predicted torque and the immediate torque from the propulsion torque arbitration module 206. Based upon a mode setting, the actuation mode module 212 determines how the predicted and immediate torques will be achieved. For example, changing the throttle valve 112 allows for a wide range of torque control. However, opening and closing the throttle valve 112 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 118 changes.

According to the present disclosure, the throttle valve 112 may be closed just enough so that the desired immediate torque can be achieved by retarding the spark as far as possible. This provides for rapid resumption of the previous torque, as the spark can be quickly returned to its calibrated timing, which generates maximum torque. In this way, the use of relatively slowly-responding throttle valve corrections is minimized by maximizing the use of quickly-responding spark retard.

The approach the actuation mode module 212 takes in meeting the immediate torque request is determined by a mode setting. The mode setting provided to the actuation mode module 212 may include an inactive mode, a pleasible mode, a maximum range mode, and an auto actuation mode.

In the inactive mode, the actuation mode module 212 may ignore the immediate torque request. For example, the actuation mode module 212 may output the predicted torque to a predicted torque control module 214. The predicted torque control module 214 converts the predicted torque to desired actuator positions for slow actuators. For example, the predicted torque control module 214 may control desired manifold absolute pressure (MAP), desired throttle area, and/or desired air per cylinder (APC).

An immediate torque control module 216 determines desired actuator positions for fast actuators, such as desired spark advance. The actuation mode module 212 may instruct the immediate torque control module 216 to set the spark advance to a calibrated value, which achieves the maximum possible torque for a given airflow. In the inactive mode, the immediate torque request does not therefore reduce the amount of torque produced or impact spark advance from calibrated values.

In the pleasible mode, the actuation mode module 212 may attempt to achieve the immediate torque request using only spark retard. This may mean that if the desired torque reduction is greater than the spark reserve capacity (amount of torque reduction achievable by spark retard), the torque reduction will not be achieved. The actuation mode module 212 may therefore output the predicted torque to the predicted torque control module 214 for conversion to a desired throttle area. The actuation mode module 212 may output the immediate torque request to the immediate torque control module 216, which will retard the spark as much as possible to attempt to achieve the immediate torque.

In the maximum range mode, the actuation mode module 212 may instruct the cylinder actuator module 120 to turn off one or more cylinders to achieve the immediate torque request. The actuation mode module 212 may use spark retard for the remainder of the torque reduction by outputting the immediate torque request to the immediate torque control module 216. If there is not enough spark reserve capacity, the actuation mode module 212 may reduce the predicted torque request going to the predicted torque control module 214.

In the auto actuation mode, the actuation mode module 212 may decrease the predicted torque request output to the predicted torque control module 214. The predicted torque may be reduced only so far as is necessary to allow the immediate torque control module 216 to achieve the immediate torque request using spark retard.

The immediate torque control module 216 sets spark advance using the spark actuator module 126 to achieve the desired immediate torque. The predicted torque control module 214 generates a desired area signal, which is output to the throttle actuator module 116. The throttle actuator module 116 then regulates the throttle valve 112 to produce the desired throttle area.

Figure 3:
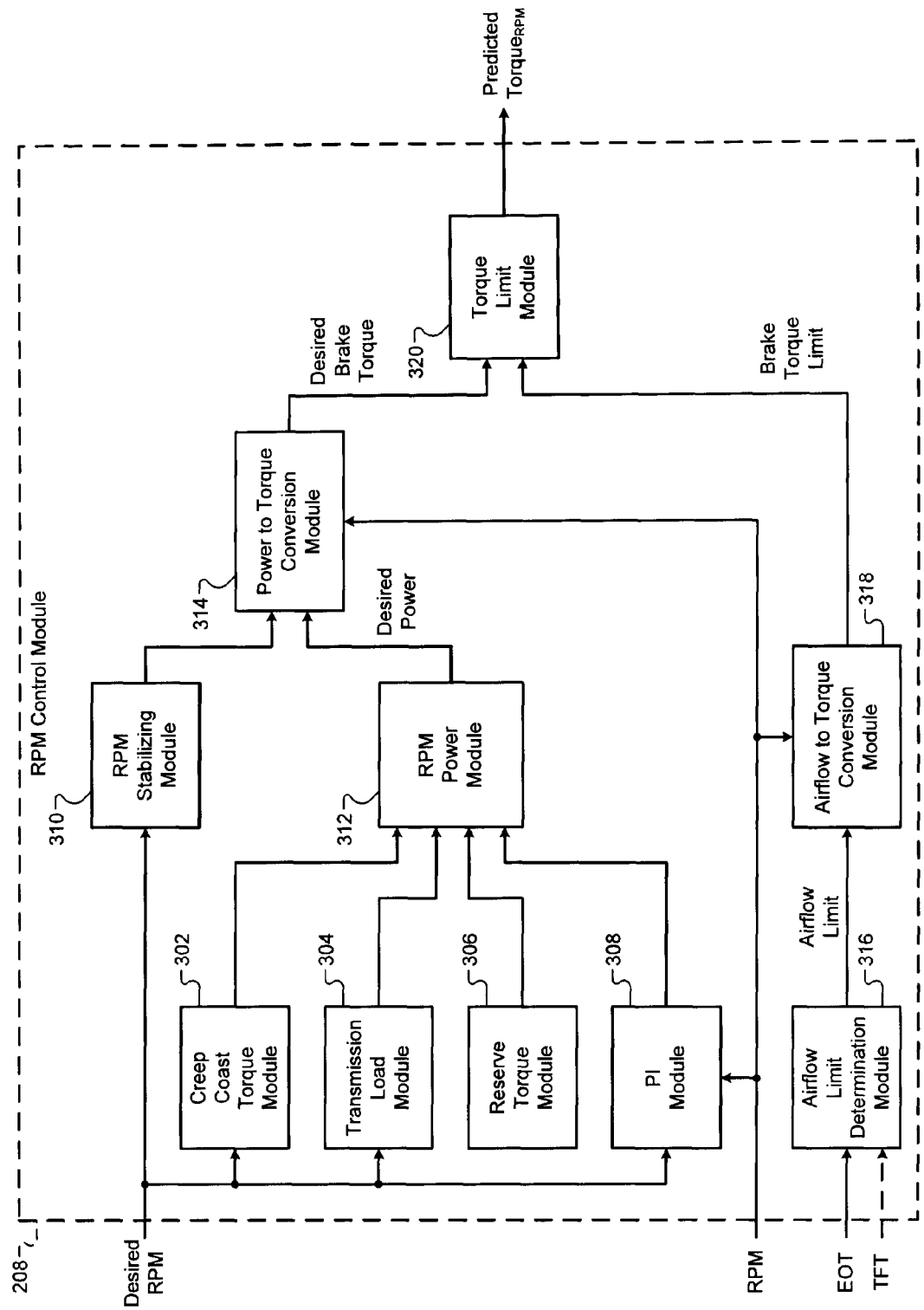
FIG. 3 is a functional block diagram of an exemplary implementation of an RPM control module according to the principles of the present disclosure.

Referring now to FIG. 3, a functional block diagram of the RPM control module 208 is presented. The RPM control module 208 includes a creep coast torque module 302, a transmission load module 304, a reserve torque module 306, and a proportional-integral (PI) module 308. The RPM control module 208 further includes an RPM stabilizing module 310, an RPM power module 312, and a power to torque conversion module 314. The RPM control module 208 further includes an airflow limit determination module 316, an airflow to torque conversion module 318, and a torque limit module 320.

The desired RPM signal is received by the creep coast torque module 302, the transmission load module 304, and the PI module 308. The desired RPM signal may also be received by the RPM stabilizing module 310. The creep coast torque module 302 determines the torque the driver should experience when the accelerator pedal is at a zero pedal position (i.e., when the driver is off the accelerator pedal).

The transmission load module 304 determines the load the transmission puts on the engine 102. The reserve torque module 306 determines the amount of reserve torque that the engine 102 should have available for unknown loads events such as power steering inputs and alternator load changes. The PI module 308 generates a proportional term and an integral term based on the difference between the desired RPM and the actual RPM. In various implementations, the RPM stabilizing module 310 may apply a low-pass filter to the desired RPM signal.

The RPM power module 312 receives the outputs of the creep coast torque module 302, the transmission load module 304, the reserve torque module 306, and the PI module 308. The RPM power module 312 determines a desired power that will enable the engine 102 to run at the desired RPM. In various implementations, the RPM power module 312 may sum the values received.

Power is a natural domain for controlling the idle of an engine. Idling the engine at a speed may require a certain amount of power equal to the product of torque and the speed. Assuming that the load does not change, and therefore that the same power level will be needed, a decrease in speed would lead to an increase in torque to maintain the same torque-speed product, or power. Similarly, if the engine speed increases, less torque will be used to return to the desired engine speed.

In order for the output of the RPM control module 208 to be arbitrated with other brake (axle) torque requests by the propulsion torque arbitration module 206, the desired power may be converted to a torque value. The desired power is therefore output to a power to torque conversion module 314. The power to torque conversion module 314 receives the stabilized desired RPM signal and the actual RPM signal. The power to torque conversion module 314 converts the desired power to a desired brake torque (i.e., a torque at the brakes of the vehicle) based on the stabilized desired RPM and the actual RPM. Further discussion of the conversion of the desired power to the desired brake torque can be found in commonly assigned patent application 61/019,945, filed Jan. 9, 2008, and entitled "Airflow-Based Speed Control in a Torque-Based System," the disclosure of which is incorporated herein by reference in its entirety.

Like the desired brake torque that is determined via the power domain, a limit on the desired brake torque is determined via the power domain as described herein. The limit on the desired brake torque is applied to the desired brake torque to prevent torque requests that would startle the driver. To determine the limit on the desired brake torque via the power domain, an airflow limit (i.e., a limit on an airflow into the engine 102) is determined because the airflow is a form of power.

The airflow limit determination module 316 receives the EOT signal from the EOT sensor 182. The airflow limit determination module 316 determines the airflow limit based on a predetermined model that relates the airflow limit to the EOT. Determining the airflow limit based on the EOT gives the RPM control module 208 more torque authority when the engine 102 is cold. When cold, the engine 102 requires more airflow to overcome engine oil friction.

In another implementation, the airflow limit determination module 316 receives a transmission fluid temperature (TFT) signal from a TFT sensor (not shown). The TFT sensor may be located within the transmission or at other locations where transmission fluid is circulated. The airflow limit determination module 316 determines the airflow limit based on a predetermined model that relates the airflow limit to the TFT.

The airflow to torque conversion module 318 receives the airflow limit and the actual RPM signal and converts the airflow limit into a brake torque limit (i.e., the limit on the desired brake torque) based on the actual RPM signal. Further discussion of the conversion of an airflow value to a brake torque value can be found in the aforesaid commonly assigned patent application. The torque limit module 320 receives the desired brake torque and the brake torque limit and applies the brake torque limit to the desired brake torque to determine the predicted torque. The predicted torque is less than or equal to the brake torque limit.

Figure 4:
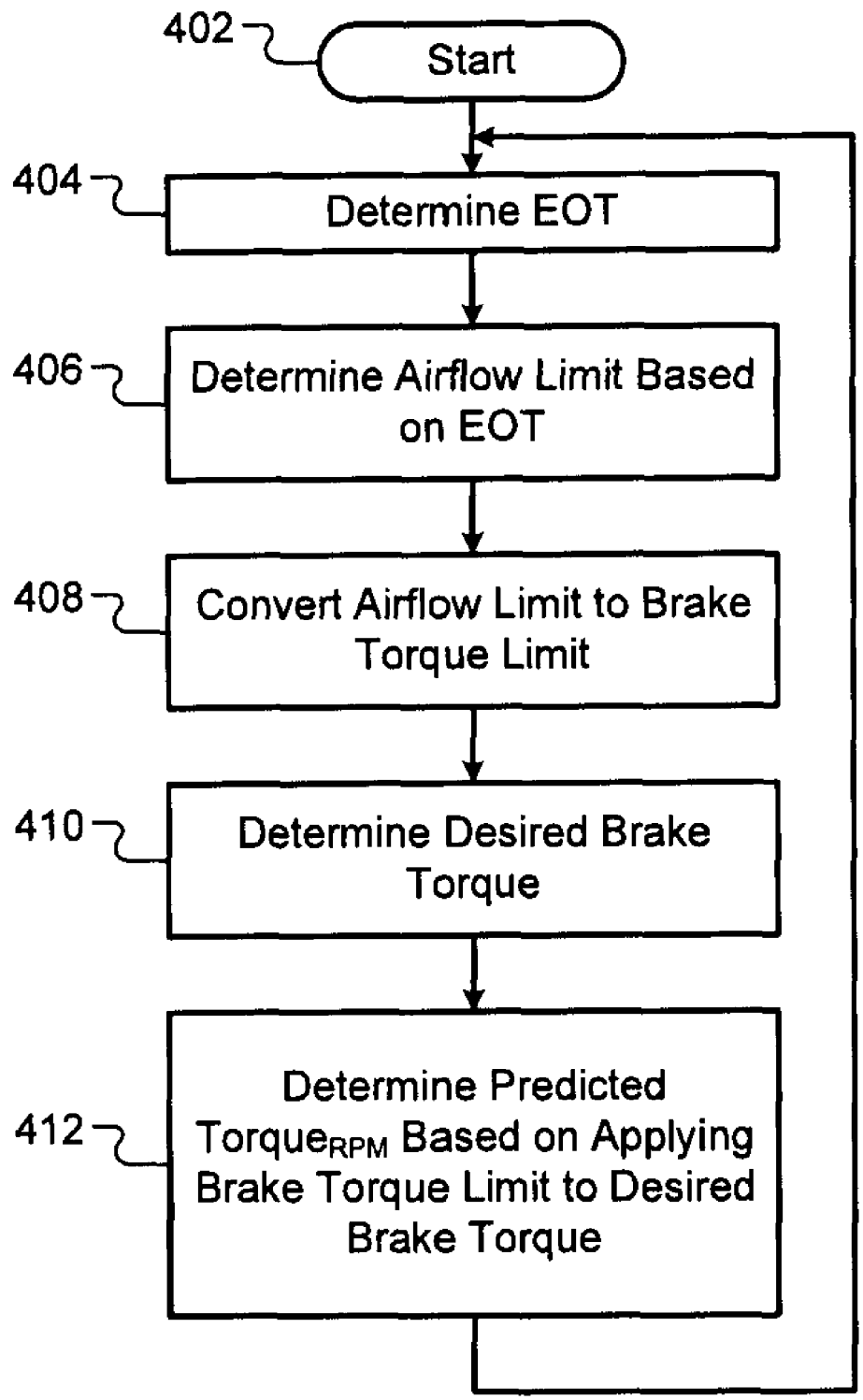
FIG. 4 is a flowchart depicting exemplary steps performed by the engine control module according to the principles of the present disclosure.

Referring now to FIG. 4, a flowchart depicting exemplary steps performed by the ECM 114 when in an RPM mode is presented. In various implementations, the RPM mode may be entered when the torque requested by the driver is less than a predetermined value for a calibratable amount of time. In other words, the RPM mode may be entered when the driver is applying less than a specified pressure to the pedal for a calibratable amount of time. In addition, the RPM mode may be disabled when the engine is cranking upon start-up.

Control begins in step 402. In step 404, the EOT is determined. In another implementation, the TFT is determined. In step 406, the airflow limit is determined based on the EOT. In the other implementation, the airflow limit is determined based on the TFT.

In step 408, the airflow limit is converted to the brake torque limit. In step 410, the desired brake torque is determined. In step 412, the predicted torque is determined based on applying the brake torque limit to the desired brake torque. Control returns to step 404.

Figure 5:
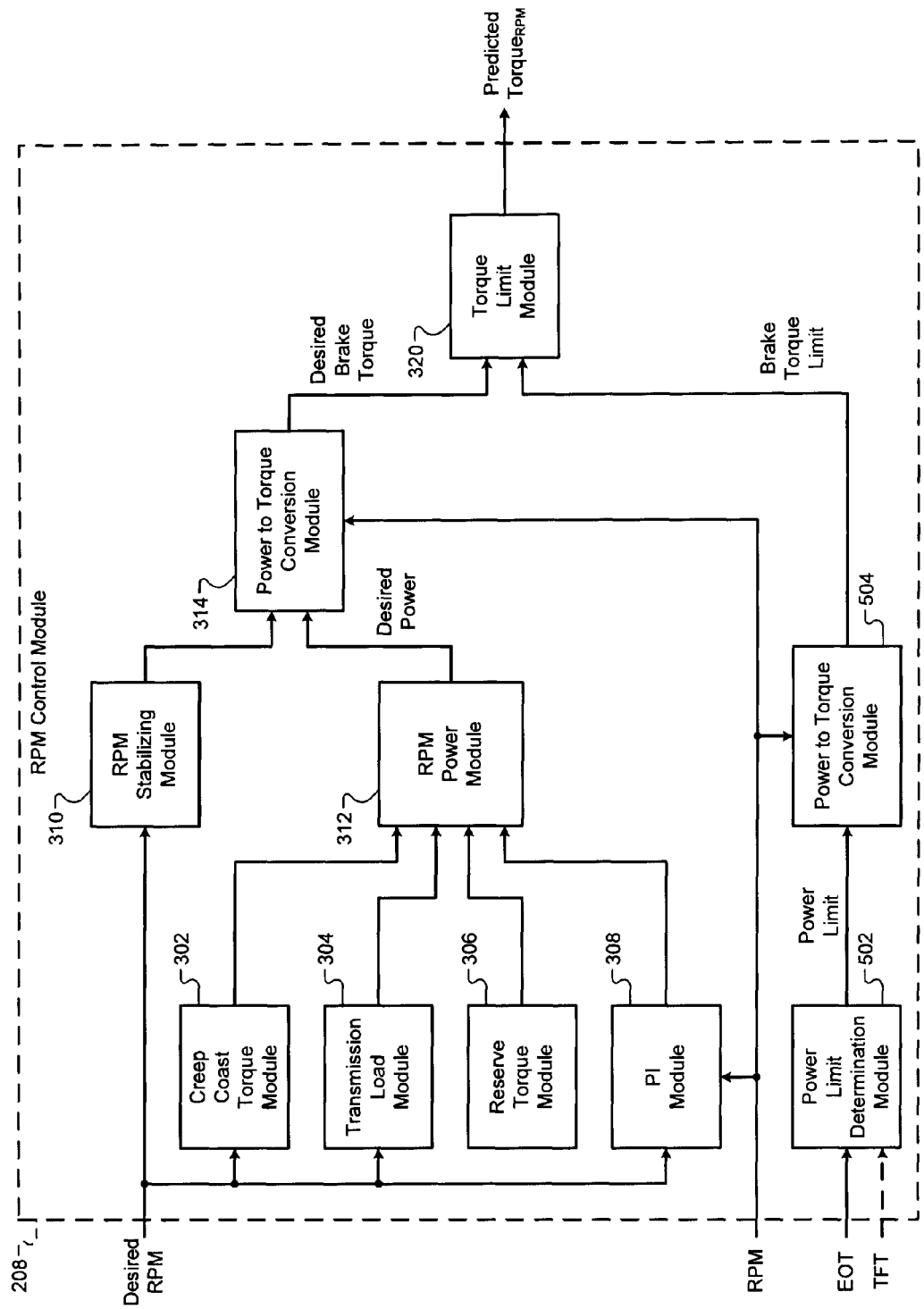
FIG. 5 is a functional block diagram of another exemplary implementation of the RPM control module according to the principles of the present disclosure.

Referring now to FIG. 5, a functional block diagram of another exemplary implementation of the RPM control module 208 is presented. The RPM control module 208 includes the creep coast torque module 302, the transmission load module 304, the reserve torque module 306, and the proportional-integral (PI) module 308. The RPM control module 208 further includes the RPM stabilizing module 310, the RPM power module 312, and the power to torque conversion module 314. The RPM control module 208 further includes a power limit determination module 502 and a power to torque conversion module 504.

To determine the limit on the desired brake torque via the power domain, a power limit (i.e., a limit on a power produced by the engine 102) is determined based on the EOT and/or the TFT. The power limit determination module 502 receives the EOT signal and/or the TFT signal. The power limit determination module 502 determines the power limit based on a predetermined model that relates the power limit to the EOT and/or the TFT.

The power to torque conversion module 504 receives the power limit and the actual RPM and converts the power limit to the brake torque limit based on the actual RPM. Further discussion of the conversion of a power value to a brake torque value can be found in the aforesaid commonly assigned patent application. The torque limit module 320 receives the brake torque limit and the desired brake torque and applies the brake torque limit to the desired brake torque to determine the predicted torque. The predicted torque is less than or equal to the brake torque limit.

Figure 6:
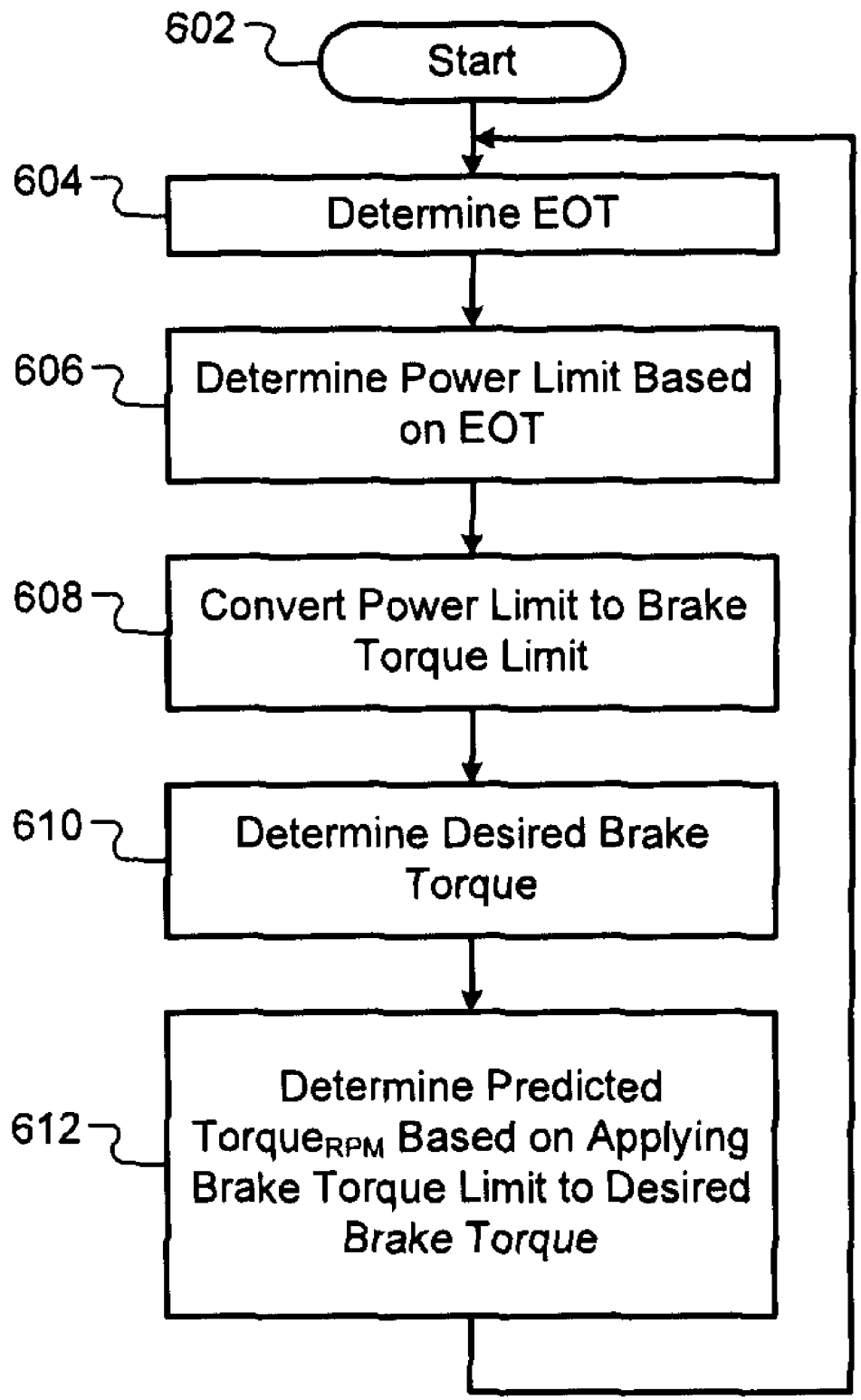
FIG. 6 is a flowchart depicting alternative exemplary steps performed by the engine control module according to the principles of the present disclosure.

Referring now to FIG. 6, a flowchart depicting alternative exemplary steps performed by the ECM 114 when in the RPM mode is presented. Control begins in step 602. In step 604, the EOT is determined. In another implementation, the TFT is determined.

In step 606, the power limit is determined based on the EOT. In the other implementation, the power limit is determined based on the TFT. In step 608, the power limit is converted to the brake torque limit. In step 610, the desired brake torque is determined. In step 612, the predicted torque is determined based on applying the brake torque limit to the desired brake torque. Control returns to step 604.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
    a torque determination module that determines a first desired torque based on a desired engine speed and that determines a torque correction factor based an actual engine speed;
    a limit determination module that determines a torque limit based on one of an engine oil temperature and a transmission fluid temperature, and at least one of a second desired torque based on an accelerator pedal position, a torque of a transmission load on an engine, a reserve torque, and the torque correction factor;
    a torque limit module that determines a final torque based on the first desired torque and the torque limit; and
    a torque control module that selectively determines a throttle area based on the final torque, wherein a throttle valve is actuated based on the throttle area.

2. The engine control system of claim 1 wherein the limit determination module determines the torque limit based on an airflow limit.

3. The engine control system of claim 2 wherein the limit determination module determines the airflow limit based on one of the engine oil temperature and the transmission fluid temperature.

4. The engine control system of claim 1 wherein the limit determination module determines the torque limit further based on the actual engine speed.

5. The engine control system of claim 1 wherein the torque determination module determines each of the second desired torque, the torque of the transmission load on the engine, and the torque correction factor further based on the desired engine speed.

6. A method of operating an engine control system, comprising:
    determining a first desired torque based on a desired engine speed;
    determining a torque correction factor based on an actual engine speed;
    determining a torque limit based on one of an engine oil temperature and a transmission fluid temperature, and at least one of a second desired torque based on an accelerator pedal position, a torque of a transmission load on an engine, a reserve torque, and the torque correction factor;
    determining a final torque based on the first desired torque and the torque limit;
    selectively determining a throttle area based on the final torque; and
    actuating a throttle valve based on the throttle area.

7. The method of claim 6 further comprising determining the torque limit based on an airflow limit.

8. The method of claim 7 further comprising determining the airflow limit based on one of the engine oil temperature and the transmission fluid temperature.

9. The method of claim 6 further comprising determining the torque limit further based on the actual engine speed.

10. The method of claim 6 further comprising determining each of the second desired torque, the torque of the transmission load on the engine, and the torque correction factor further based on the desired engine speed.

* * * * *